W. STARRETT.
BELT.
APPLICATION FILED APR. 18, 1913.
1,135,734. Patented Apr. 13, 1915.
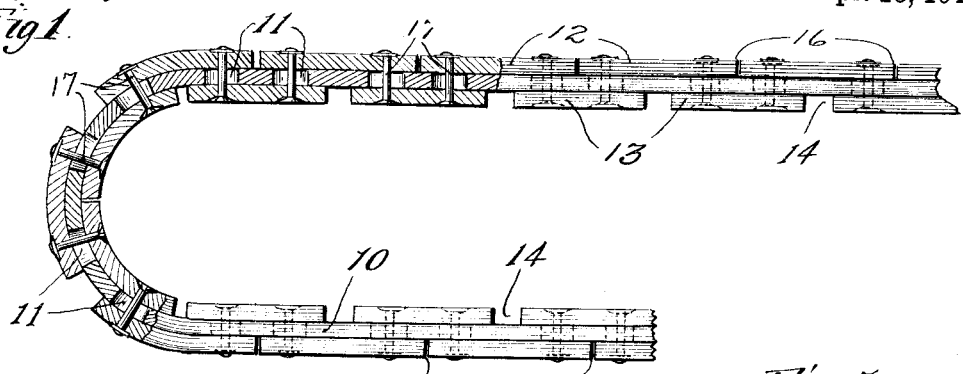
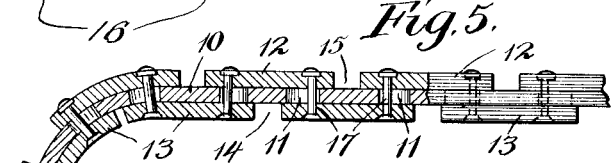
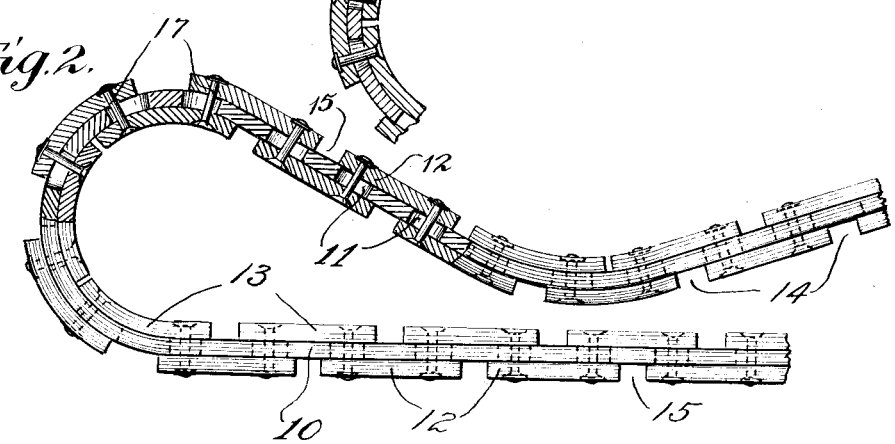
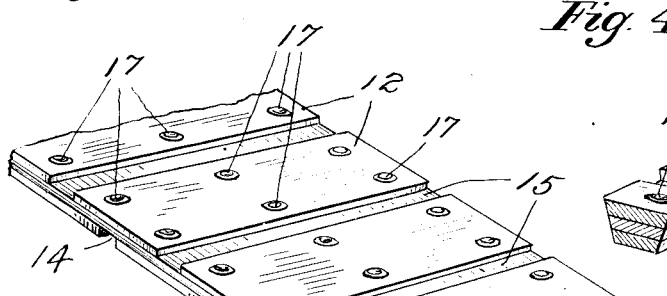
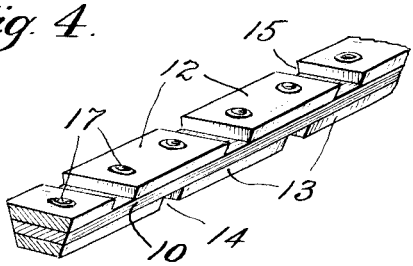
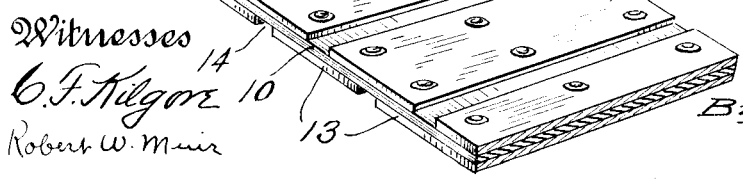
Witnesses
C. F. Kilgore
Robert W. Muir
Inventor
William Starrett
By
F. A. Whiteley
His Attorney

UNITED STATES PATENT OFFICE.

WILLIAM STARRETT, OF MINNEAPOLIS, MINNESOTA.

BELT.

1,135,734. Specification of Letters Patent. Patented Apr. 13, 1915.

Application filed April 18, 1913. Serial No. 761,960.

*To all whom it may concern:*

Be it known that I, WILLIAM STARRETT, citizen of the United States, residing at Minneapolis, in the county of Hennepin and State of Minnesota, have invented certain new and useful Improvements in Belts, of which the following is a specification.

My invention relates to belts and particularly to belts of that type in which a number of thicknesses of leather or equivalent material are laid one upon the other for the purpose of increasing the weight and strength of the belt and, necessarily, at the same time increasing its thickness. The so-called triangular or V-shaped belts are necessarily formed in this manner and are often thicker through in the radial lines of curvature than the greatest width of the belt. Such belts have in practice been found generally unsatisfactory for the reason that the tension produced upon the outer layers of leather when the same are bent about a pulley of even approximately small diameter becomes so great as to cause cracking of said outer layer and ultimate destruction of the belt. Furthermore, such belts are so lacking in flexibility as to be incapable of use excepting on fairly large pulleys. There is an extensive demand for a belt of the V-shape type to be used as a drive belt on motor cycles, but heretofore such belts when made of leather or textile material have not proved satisfactory because they cannot be run over the small pulleys used on motor cycles, or if run will soon break and be rendered useless.

It is the object of my invention to provide a belt formed of several plies of leather or equivalent material, a part of said plies being formed of spaced segments, and means connecting the plies together so as to permit a differential movement of the plies with respect to one another. In effecting this object I form, in at least one of the plies of which the belt is composed, elongated slots through which extend rivets or other means for securing together the several plies, said slots permitting the rivets to move along the same when the belt is sharply curved and thereby enabling the plies to have the aforesaid differential movement which renders the belt flexible to practically the extent that would be true of a single ply.

The full objects and advantages of my invention will appear in connection with the detailed description thereof and are particularly pointed out in the claims.

In the drawings, illustrating the application of my invention in one form,—Figures 1 and 2 illustrate edge views of portions of a belt embodying my invention, part of the same being shown in section through the lines of connecting rivets. Fig. 3 is a perspective view of a flat belt similar to that shown in Figs. 1 and 2. Fig. 4 is a perspective view of a V-shaped or triangular belt of the same character. Fig. 5 is an edge view, partly in section, of a portion of a belt embodying my invention.

As shown in Fig. 1, I provide a belt having a central continuous ply 10, said central ply being formed with a series of longitudinal slots 11. On one side of said continuous ply is a series of short belt sections 12, a similar series of belt sections 13 being arranged on the other or inner side of the belt. The inner sections 13 are in all cases spaced apart at their ends a suitable distance, as indicated at 14. The outer sections 12 may, as indicated in Figs. 2, 3, and 4 at 15, be normally spaced apart a suitable distance, or may, as indicated at 16 in Fig. 1, have the adjacent ends in contact when the belt extends in a straight line, where there is but little curvature needed on the back of the belt. In Fig. 2, where the spaces 15 are left between adjacent ends of the upper ply sections the belt will have as great a flexibility in a backward direction as in a forward direction, which may be of some advantage where a belt tightener is employed, as indicated by the curvature in the belt in Fig. 2 and wherever there will be enough flexibility in the form shown in Fig. 1 to make practicable the employment of a belt tightener. The outer plies or ply sections 12 and 13, as shown in Figs. 1, 2, 4 and 5, are secured in fixed relation to one another over and under the central ply 10 by means of rivets 17 extending through the slots 11 and firmly set in the ply sections 12 and 13. As shown in Figs. 1 and 2, the rivets 17 normally extend through the centers of slots 11 when the belt is extended in a straight line. With the triangular form of belt ordinarily a single row of rivets and correspondingly a single row of slots in the continuous belt ply 10 is all that will be required. But for a flat belt a plurality of rows of rivets 17 and of slots 11 will be required.

As shown in Fig. 5, the rivets 17 have the shanks thereof extending through slots 11 in contact with the ends of the slots nearest the ends of the top ply sections 12. This arrangement will permit differential movement of the plies when the belt is turned inwardly, but not when the belt is turned outwardly or toward the back.

The operation of my improved belt, whichever form is employed, is the same in principle, namely, a relative slipping or differential movement between the different plies of the belt made possible by the provision of the slots in at least one of said plies through which the rivets extend, so that the ends of the sectional plies may and do actually move toward and away from one another as the belt is passed around a pulley, thus entirely withdrawing the tension strain from the outer plies due to the fulcruming effect of the compression of material in the inner plies when the belt is being passed around a pulley.

The objects of my improved belt are very apparent. It makes practicable the building up of a V-shaped or triangular belt, that is a belt in which the friction is effected by the sides thereof with the sides of a grooved pulley rim, which will be nearly if not quite as flexible as an ordinary flat belt. Moreover, this result is effective by using for a large part of the weight of the belt short pieces of stock which might otherwise not be of great value. Where the invention is applied to flat belts, a belt of the requisite weight and strength may be provided also by using considerable portions of short stock and which yet will have a high degree of flexibility and will be much less liable to injury from cracking and tension strain than would be the case if the same weight of material were combined to make a belt of the same strength in which all the parts were integrally united.

I claim:

1. A belt comprising three independent strands or plies, of which the center strand or ply is continuous while the outer strands or plies are each formed of a series of short sections spaced apart at the ends, longitudinally alined slots being formed in the continuous strand or ply, and rivets fixedly secured in the outer sectional strands or plies and extending through the slots to permit differential relative movement of the strands or plies as the belt is curved in passing around a pulley.

2. A belt comprising three independent strands or plies, of which the center strand or ply is continuous while the outer strands or plies are each formed of a series of short sections spaced apart at the ends, longitudinally alined slots being formed in the continuous strand or ply, there being two such slots for each section of the sectional strands or plies, and rivets fixedly secured in the sectional strands or plies and extending through the slots in such position that the shanks of the rivets will engage the end walls of the slots adjacent the ends of the upper sections of the belt to hold the strands or plies together and permit differential relative movement of said strands or plies, said differential movement taking place only when the belt is inwardly curved.

In testimony whereof I affix my signature in presence of two witnesses.

WILLIAM STARRETT.

Witnesses:
F. H. GEORGE,
ROBERT W. MUIR.